M. SCHOU.
Thill Coupling.
No. 103,508. Patented May 24, 1870.
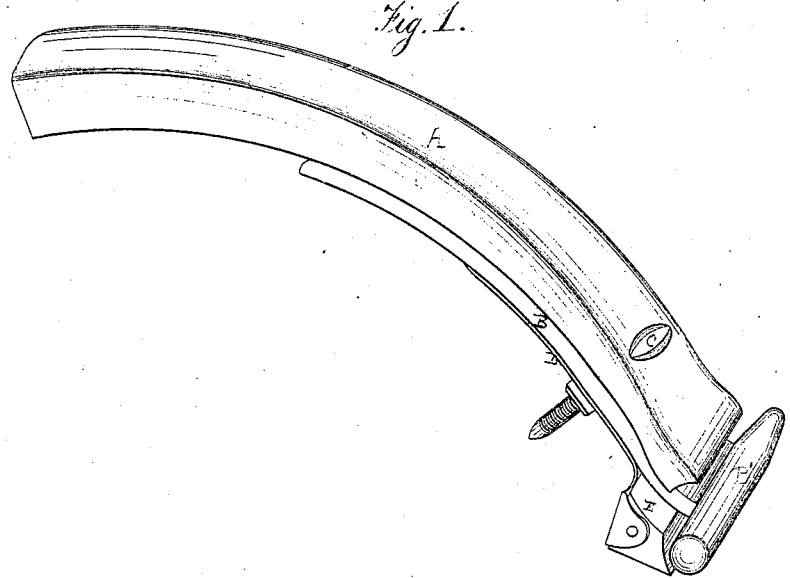
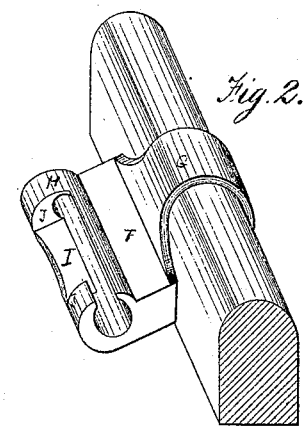
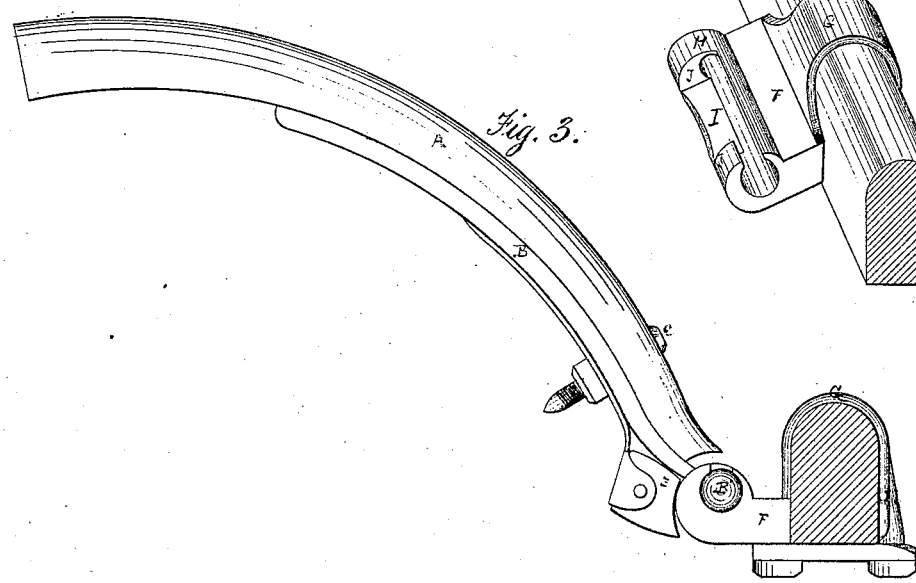

United States Patent Office.

MATHIAS SCHOU, OF ENGLISHTOWN, NEW JERSEY.

Letters Patent No. 103,508, dated May 24, 1870.

IMPROVEMENT IN JACKS FOR CONNECTING POLES AND SHAFTS TO WAGONS.

The Schedule referred to in these Letters Patent and making part of the same.

I, MATHIAS SCHOU, of the village of Englishtown, in the township of Manalapan, in the county of Monmouth and State of New Jersey, have invented certain Improvements in Jacks used for Connecting Poles and Shafts to Wagons, of which the following is a specification.

This invention relates to a device for attaching poles and thills to vehicles, and has for its object a coupling which shall be easily attachable and detachable, and which shall not be liable to become loose in its bearing by wear; nor subject to the disagreeable rattling noise common to ordinary thill-couplings.

Description of the Accompanying Drawing.

Figure 1 is a perspective view of the shaft and shaft-iron.

Figure 2 is a perspective view of the clip and socket.

Figure 3 is a side elevation representing the above parts coupled together.

General Description.

A represents an ordinary shaft.

B is the shank, and B' the head of the shaft-iron, the same being attached to the shaft by the bolt C; this bolt serves also to support the holder D, in which is carried the rubber presser E, as is clearly shown in the drawing at figs. 1 and 3.

F is the socket of the coupling rigidly attached to the clip G, which in turn is carried upon the appropriate part of the vehicle.

The socket F is made with an aperture for the admission of the shaft-iron, said aperture being made tapering to correspond to the taper of the head B' of the shaft-iron.

A slot is cut through the upper side of the socket to admit of the passage of the shank of the shaft-iron.

This said slot is not continued through the entire socket, but terminates at the part H.

The front or face of said socket is cut squarely through to the aperture to form a notch or bearing, I, for the shank of the shaft-iron, and of a width corresponding to said shank.

To couple the shaft to the vehicle, it is held in an upright position, and the head of the shaft-iron is passed into the aperture of the socket, the shank thereof passing through the slot until it reaches the part H, when the shaft is brought down until the shank rests upon the bearing I, where it is held and prevented from moving laterally by the jamb J, forming a perfect lock.

The rubber presser E is so attached as that, when the shaft is brought down, the said presser will be firm against the outer surface of the socket, thus preventing the coupling from unnecessary jar and rattle.

By the peculiar tapering form of the shaft-iron head, the parts are made to fit perfectly when in place, and are easily coupled.

What I claim as my invention is—

1. The combination of the shaft-iron B, having a tapering head, B', with the socket F, constructed and arranged substantially as specified and shown.

2. The combination of the parts of the above claim with the rubber presser E, substantially as specified and for the purpose set forth.

MATHIAS SCHOU.

Witnesses:
JOHN ROTH,
WILLIAM H. CRAIG.